(12) United States Patent
Sayegh

(10) Patent No.: US 9,025,591 B2
(45) Date of Patent: May 5, 2015

(54) FORWARD AND REVERSE CALIBRATION FOR GROUND-BASED BEAMFORMING

(71) Applicant: ViaSat, Inc., Carlsbad, CA (US)

(72) Inventor: Soheil Sayegh, Gaithersburg, MD (US)

(73) Assignee: ViaSat, Inc., Carlsbad, CA (US)

(*) Notice: Subject to any disclaimer, the term of this patent is extended or adjusted under 35 U.S.C. 154(b) by 333 days.

(21) Appl. No.: 13/710,063

(22) Filed: Dec. 10, 2012

(65) Prior Publication Data

US 2013/0100879 A1    Apr. 25, 2013

Related U.S. Application Data

(62) Division of application No. 12/596,609, filed as application No. PCT/US2007/080720 on Oct. 8, 2007, now Pat. No. 8,331,329.

(60) Provisional application No. 60/828,539, filed on Oct. 6, 2006.

(51) Int. Cl.
*H04B 7/216*    (2006.01)
*H04B 7/185*    (2006.01)

(52) U.S. Cl.
CPC .................. *H04B 7/18513* (2013.01)

(58) Field of Classification Search
USPC ........................................ 370/335
See application file for complete search history.

(56) References Cited

U.S. PATENT DOCUMENTS

| | | | | |
|---|---|---|---|---|
| 6,052,085 A | * | 4/2000 | Hanson et al. | 342/373 |
| 6,728,202 B1 | * | 4/2004 | Sayeed et al. | 370/208 |
| 6,985,466 B1 | * | 1/2006 | Yun et al. | 370/335 |
| 2003/0128671 A1 | * | 7/2003 | Niesen | 370/313 |
| 2004/0085938 A1 | * | 5/2004 | Tiedemann et al. | 370/335 |
| 2014/0161025 A1 | * | 6/2014 | Chang | 370/316 |

* cited by examiner

*Primary Examiner* — Kenny Lin
(74) *Attorney, Agent, or Firm* — Holland & Hart, LLP

(57) ABSTRACT

Methods and systems for calibrating the return and forward links of a satellite communication system are provided according to embodiments of the invention. The phase and/or amplitude variations caused by the return and forward links are calculated and/or estimated to aid in beamforming, such as ground-based beamforming. Calibration earth stations, distributed within one or more beam patterns, may be used to transmit calibration codes to the gateway to calibrate the return link. Return links variations may be estimated using a weighted minimum mean square algorithm at the gateway. Forward links may be calibrated with calibration codes transmitted from the gateway through a hybrid matrix to at least one calibration station. Forward calibration links may also calibrate for temperature-dependent signal variations such as diplexer variations at the satellite.

7 Claims, 17 Drawing Sheets

FORWARD AND REVERSE CALIBRATION FOR GROUND-BASED BEAMFORMING

CROSS-REFERENCES TO RELATED APPLICATIONS

This application is a division of, and claims priority to, U.S. patent application Ser. No. 12/596,609, filed Mar. 30, 2010, issuing as U.S. Pat. No. 8,331,329 on Dec. 11, 2012, which is a U.S. National Phase Application of PCT/US2007/080720, filed Oct. 8, 2007, which claims the benefit of commonly assigned U.S. Provisional Patent Application No. 60/828, 539, filed Oct. 6, 2006, entitled "Forward Calibration With Hybrid Matrix For Ground-Based Beamforming," wherein the entireties of U.S. Provisional Patent Application No. 60/828,539 and U.S. patent application Ser. No. 12/596,609 are incorporated herein by reference for all purposes.

BACKGROUND OF THE INVENTION

Some satellite systems include mobile satellite programs where multiple spot beams spread over a large geographic area that are engaged to connect a large number of mobile users to a gateway. Multiple spot beams can be generated using either a phased array or a reflector antenna with an array feed. Some systems may utilize many feed elements and may beamform combinations of these to generate multiple beams.

Beamforming is implemented by adjusting the amplitude and phase of each signal path routed to each feed element. Each individual signal path is routed to multiple feeds with relative amplitudes and phases which define each intended beam. On many satellite programs, beamforming is accomplished by constructing a fixed beamforming network behind the feed array. Satellite systems have employed an onboard digital signal processor (DSP) which performs digital beamforming allowing an entire beam pattern to be re-optimized at any time during the life of the spacecraft. The DSP, however, adds significant weight and power demands to the payload. Ground-based beamforming (GBBF) provides the same or greater flexibility than digital beamforming onboard the satellite without the weight and power penalty of an onboard DSP.

GBBF may require knowledge of the phase and/or amplitude variations caused by the return and forward links. Various satellite components, such as amplifiers, DSP, hybrid matrices, and diplexers, to name a few, may affect the phase and/or amplitude of a signal. There is a need in the art for ground-based systems and methods that determine the phase and/or amplitude effects of the forward and return link paths.

BRIEF SUMMARY OF THE INVENTION

The present invention relates to wireless communications in general and, in particular, to forward and return link calibration of satellite communication systems that employ GBBF.

A method for estimating the effects of a satellite return link at a gateway is provided according to one embodiment of the invention. The method includes receiving at a gateway a signal comprising a plurality of PN codes from a plurality of calibration stations through the satellite. The satellite receives the PN codes from the calibration stations through one or more satellite feeds, the satellite retransmits the PN codes to the gateway, and at least two of the plurality of calibration stations are located within distinct satellite beam coverage areas. The gateway extracts phase information from the received PN codes and then estimates the phase effects of the satellite return link by applying a weighted minimum mean square algorithm to the extracted phase information.

The weighted minimum mean square algorithm used in the method described above uses at least one matrix of nominal feed excitation levels to estimate the phase effects. The method may also include receiving an indication of the satellite orbital position from the satellite, retrieving a matrix of nominal feed excitation levels from memory associated with the satellite orbital position and using the retrieved matrix of nominal feed excitation levels to estimate the phase effects. The method may further include calculating beamforming parameters using the estimated phase effects and transmitting the beamforming parameters to the satellite. The method may also extract amplitude information from the received PN codes and estimate the amplitude effects of the satellite return link by applying a weighted minimum mean square algorithm to the extracted amplitude information.

Another method for estimating the effects of a satellite return link at a gateway is provided according to another embodiment of the invention. The method may include receiving a signal comprising a plurality of PN codes from a plurality of calibration stations through the satellite. The satellite receives the PN codes from the calibration stations through one or more satellite feeds, the satellite retransmits the PN codes to the gateway, and at least two of the plurality of calibration stations are located within distinct satellite beam coverage areas. The amplitude information may then be extracted from the received PN codes and the amplitude effects of the satellite return link may be estimated by applying a weighted minimum mean square algorithm to the extracted amplitude information.

The weighted minimum mean square algorithm used in the method described above uses at least one matrix of nominal feed excitation levels to estimate the amplitude effects. The method may also include receiving an indication of the satellite orbital position from the satellite, retrieving a matrix of nominal feed excitation levels from memory associated with the satellite orbital position and using the retrieved matrix of nominal feed excitation levels to estimate the amplitude effects. The method may further include calculating beamforming parameters using the estimated amplitude effects and transmitting the beamforming parameters to the satellite.

Another method for estimating the effects of a satellite return link on a signal at a gateway is provided. The method may include receiving a signal comprising a plurality of PN codes from a plurality of calibration stations through the satellite. The satellite receives the PN codes from the calibration stations through one or more satellite feeds and retransmits the PN codes to the gateway. At least two of the plurality of calibration stations are located within distinct satellite beam coverage areas. Phase and amplitude information may then be extracted from the received PN codes. The amplitude and phase effects of the satellite return link may then be estimated by applying a weighted minimum mean square algorithm to the extracted information.

A satellite communication system is also provided according to one embodiment of the invention. The satellite communication system may include a plurality of calibration stations, a satellite comprising more than one feed, and a gateway configured to receive signals from the satellite. The calibration stations transmit PN signals to the satellite and the PN signals are received at at least one of the satellite feeds. The gateway receives the PN codes from the satellite. The gateway is configured to extract phase information from the PN codes, extract amplitude information from the PN codes, estimate the phase effects of a satellite return link using a minimum mean square algorithm, and estimate the phase effects of a satellite return link using a minimum mean square algorithm. The gateway may also include memory that stores a plurality of matrices of nominal feed excitation levels. The gateway may further be configured to receive an indication of the satellite orbital position from the satellite, retrieve a matrix of nominal feed excitation levels from memory associated with the satellite orbital position, and use the retrieved matrix of nominal feed excitation levels to estimate the amplitude effects. The gateway may also be configured to calculate beamforming parameters using the estimated amplitude effects, and transmit the beamforming parameters to the satellite.

A method for ground-based calibration of a satellite forward link is provided according to another embodiment of the invention. The method may include receiving satellite temperature data at a gateway from the satellite and determining a phase shift based on the temperature data from the satellite. A signal from the gateway may be adjusted based on the phase shift. The signal may be transmitted to the satellite.

A method for ground-based calibration of a satellite forward link is also provided according to one embodiment of the invention. The method may include receiving satellite temperature data at a gateway from the satellite and determining an amplitude shift based on the temperature data from the satellite. A signal may then be adjusted based on the amplitude shift and transmitted to the satellite.

A method for ground-based calibration of a satellite forward link is provided according to another embodiment of the invention. The method may include transmitting a plurality of orthogonal codes from a gateway to a satellite that are received at a unique feed at the satellite. The plurality of orthogonal codes are multiplexed into a linear combination of orthogonal codes at the satellite and transmitted to a plurality of calibration earth stations over a plurality of feeds. At least one of the calibration earth stations receives the linear combination of orthogonal codes with significant signal to noise ratio where the orthogonal codes are demultiplexed and the phase and/or amplitude variations are determined.

Another method for ground-based calibration of a satellite forward link is disclosed according to one embodiment of the invention. The method may include transmitting at least one PN code from a gateway to a satellite where the PN code is transmitted from the satellite through a plurality of feeds to at least one calibration earth station. The PN code is transmitted through each feed consecutively one after another. The PN codes are transmitted for 10-100 ms up to 1-10 seconds over each feed.

Yet another method for ground-based calibration of a satellite forward feeder link is provided according to another embodiment of the invention. The method may include transmitting at least one coded signal to a calibration earth station through a satellite system. The phase shift and/or amplitude shift is determined from the received coded signal at the calibration earth station. Satellite temperature data is also received at the calibration earth station from the satellite. The temperature dependent phase shift and/or temperature dependent amplitude shift is determined based on the temperature data from the satellite. The temperature dependent phase shift and/or the temperature-dependent amplitude shift is subtracted from the phase shift and/or amplitude shift, thereby providing the forward feeder link phase shift and/or amplitude shift.

Another method for ground-based calibration of a satellite forward link is provided according to another embodiment of the invention. The method may include transmitting a signal including at least one predetermined code from a gateway to at least one calibration earth station through a satellite. The signal may include a plurality of orthogonal calibration codes and is transmitted from the satellite to the calibration earth station through at least one feed. The signal is then received at calibration earth station and compared with a predetermined code. The phase and/or amplitude shift may then be determined. Beamforming parameters may be calculated using the phase and/or amplitude shifts and then transmitted to the satellite. The phase and/or amplitude shift may be determined at the gateway or a calibration earth station.

A satellite is provided according to another embodiment of the invention. The satellite may include a receiver, one or more amplifiers, an output hybrid matrix, one or more diplexers and a transmitter. The receiver is configured to receive signals from one or more gateways and may include one or more feeds. The one or more amplifiers are coupled with the one or more receiver feeds and the output hybrid matrix. The output hybrid matrix may include one or more output ports that are coupled with the diplexers. A temperature sensor may be included that measures the temperature at or near the one or more diplexers. The transmitter is configured to transmit signals received from the one or more gateways to one or more receivers and to transmit temperature data from the temperature sensor to the one or more gateways. The temperature sensor may include one or more temperature sensors.

DETAILED DESCRIPTION OF THE INVENTION

Various embodiments of the present invention comprise systems, methods, devices, and software for a novel broadband satellite network. This description provides exemplary embodiments only, and is not intended to limit the scope, applicability or configuration of the invention. Rather, the ensuing description of the embodiments will provide those skilled in the art with an enabling description for implementing embodiments of the invention. Various changes may be made in the function and arrangement of elements without departing from the spirit and scope of the invention.

Thus, various embodiments may omit, substitute, or add various procedures or components as appropriate. For instance, it should be appreciated that in alternative embodiments, the methods may be performed in an order different than that described, and that various steps may be added, omitted or combined. Also, features described with respect to certain embodiments may be combined in various other embodiments. Different aspects and elements of the embodiments may be combined in a similar manner. Also, a number of steps may be required before, after, or concurrently with the following embodiments.

Figure 1:
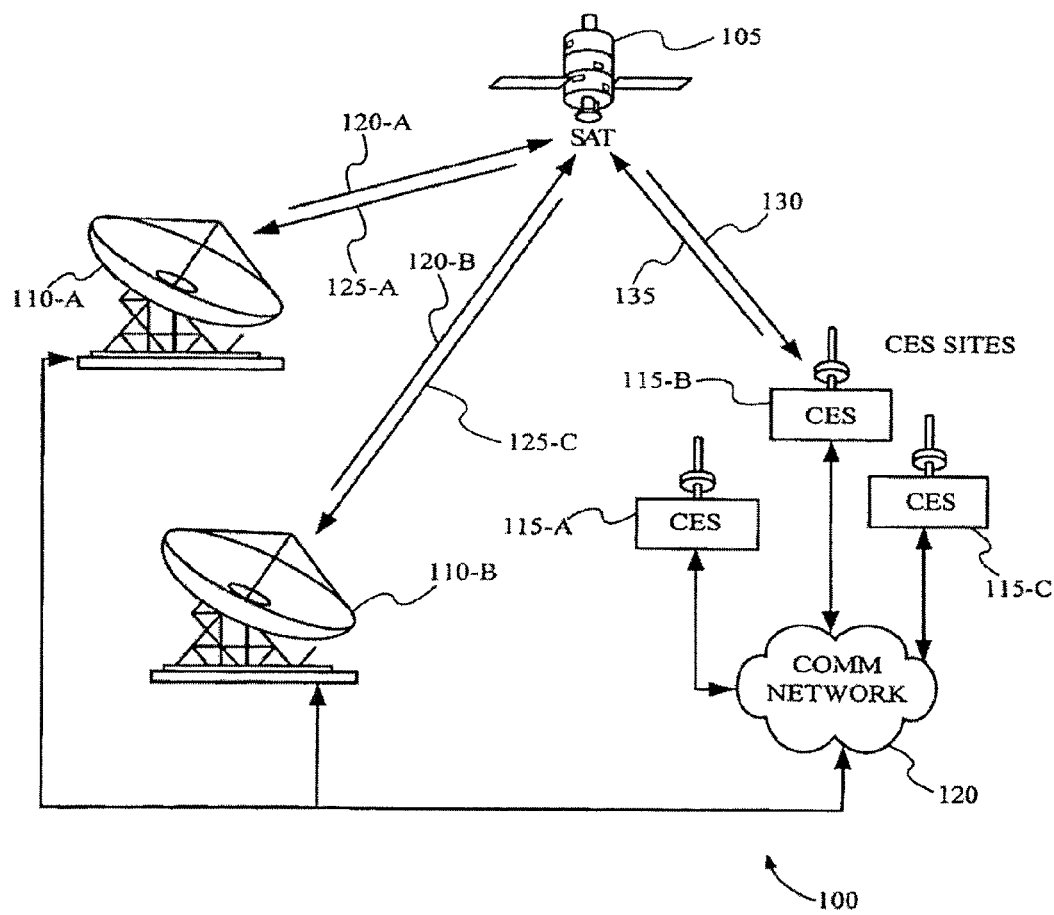
FIG. 1 shows a satellite system configuration according to one embodiment of the invention.

FIG. 1 shows a satellite system configuration 100 according to one embodiment of the invention. A satellite 105 provides a communication link between two gateways 110 and three calibration earth stations (CES) 115. While only a single satellite 105 is shown, a plurality of satellites may be used. Similarly, more than two gateways may be employed and any number of CESs may also be employed according to embodiments of the invention. For example, four gateways, may be used to cover the continental United States. Other receivers and transmitters (not shown) may also be in communication with the gateways 110 through the satellite 105. Each CES 115 is coupled to a communication network 120, for example, the Internet, which may also be coupled with the gateways 110.

Each gateway 110 may use a satellite antenna to bi-directionally communicate with a satellite 105 on a feeder link 120. A feeder link 120 communicates information from the gateway 110 to the satellite 105, and another feeder link 125 communicates information from the satellite 105 to the gateway 110. The satellite 105 may be a bent-pipe. In other embodiments the satellite may perform switching. The feeder links 120, 125 may operate, for example, in the Ku-band. The service links 130, 135 may operate, for example, in the L-band or the S-Band. Signals received at the satellite 105 from the CESs 115 in the L or S-Band may be retransmitted to the gateway(s) 110 in the Ku-Band.

Information may bi-directionally pass through the satellite 105 from the gateways, CESs or other transmitters/receivers. The satellite 105 could use antennas or phased arrays when communicating. The satellite 105 may also include multiple antenna elements. One or more antenna elements may receive a signal from a CES 115. These multiple antenna elements may provide multiple feeds from which signals may be received.

The CESs 115 may provide support for a ground-based beam-forming (GBBF) subsystem at the gateways 110. The CESs 115 may transmit and/or receive signals to or from the gateways 110 that may be used to provide both forward and reverse beam-forming at the satellite 105.

CESs 115 may be placed at each gateway site and may be strategically placed in areas of satellite coverage. For example, a satellite 105 may provide coverage for the continental United States, Hawaii and populous areas of Canada and Alaska. Such systems may include four gateways spread throughout the geography that communicate with one or two satellites. These satellites singly or in combination may then cover the receivers within varies coverage areas. The satellites may provide a plurality of spot beams each of which cover a portion of the geography. At least one CES may be positioned within each spot beam coverage area to provide return and forward link information to the gateway for creating satellite beam-forming parameters. Each CES may have a higher equivalent isotropically radiated power (EIRP) than the typical user terminal. Moreover, the CESs may be positioned throughout the geography that they have an unobstructed view of the satellite or satellites.

Figure 2:
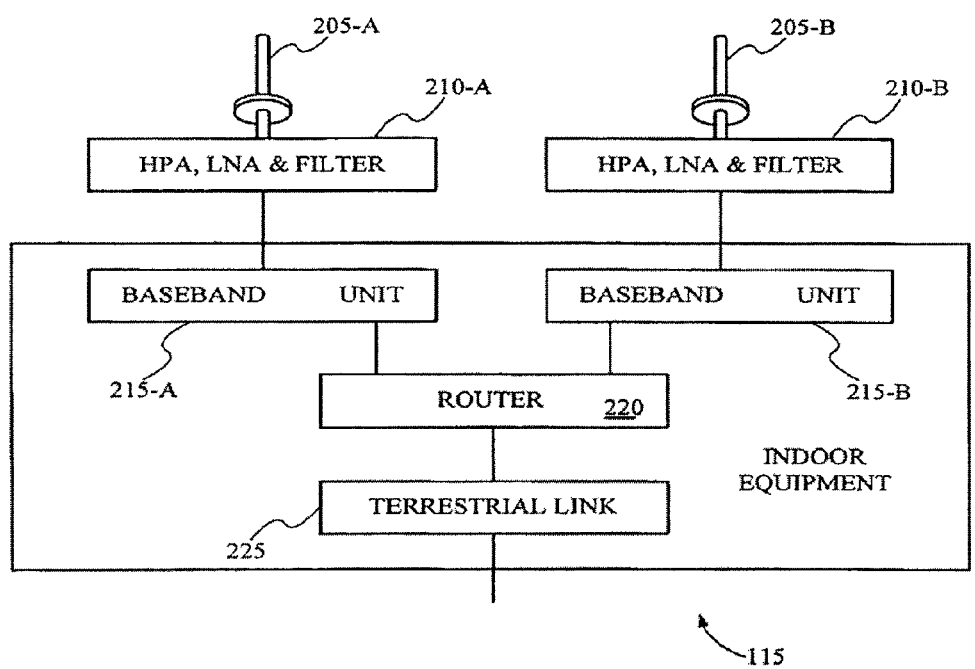
FIG. 2 shows a functional block diagram of a calibration earth station according to one embodiment of the invention.

FIG. 2 shows an exemplary CES 115 according to one embodiment of the invention. According to this embodiment of the invention, the CES employs two antennas 205 to allow transmit signals with different polarization. The CES may also include a high power amplifier (HPA), a low noise amplifier (LNA) and or various filters 210 that condition the signal prior to transmission at the antennas 205. A baseband unit 215, as known in the art, may also be included. A router 220 and terrestrial link 225 may provide communication access to the network. In one embodiment of the invention, each CES may transmit a unique code to the gateway that is used at the gateway to calibrate the satellite return link. These unique codes may be orthogonal to each other. Moreover, the codes may be pseudo-noise sequences (PN codes). For example, each code may be a column or row from a Walsh Matrix.

Figure 3A:
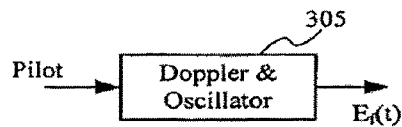
FIGS. 3A-3E are three a block diagrams showing portions of a return link calibration according to one embodiment of the invention.

FIGS. 3A-3E are block diagrams showing various portions of a return link calibration scheme according to one embodiment of the invention. Turning first to FIG. 3A, which shows various fast effects of the return link. Pilot signals are transmitted through the return link and undergo Doppler and/or oscillator shifts as shown in block 305. Doppler shifts are caused by the motion of the satellite relative to the gateway and/or the CESs. Oscillator shifts are shifts related to differences in the oscillators at the CESs, gateway and/or the satellite. The fast error effects is determined and returned as $E_f(t)$. Those skilled in the art will recognize how to extract these Doppler and oscillator amplitude and phase shifts.

Figure 3B:
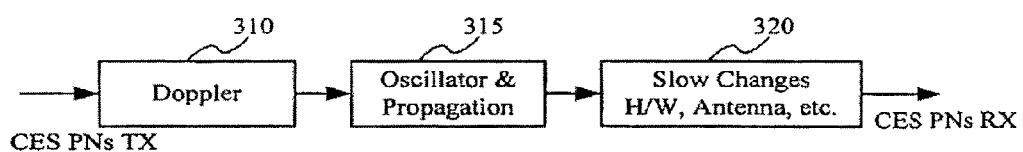

FIG. 3B shows a block diagram detailing various effects encountered by PN codes transmitted by a CES to a gateway through the return link. These effects are commonly called medium effects. These effects may include medium Doppler effects 310, oscillator and propagation effects 315, and various medium effects from hardware, antenna, etc 320.

Figure 3C:
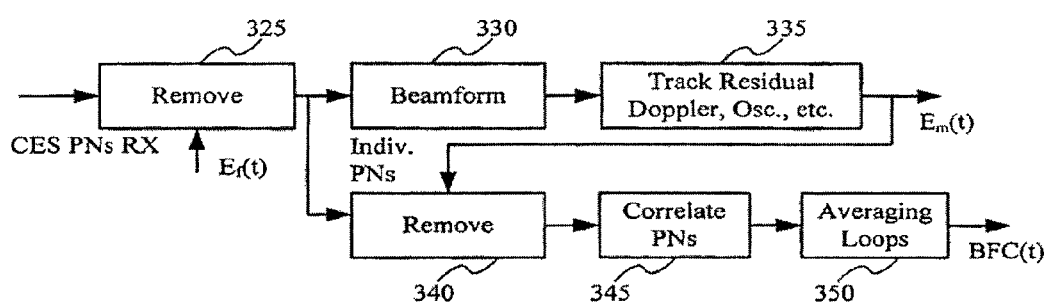

FIG. 3C shows a block diagram of a method used to track the medium effects and produce beamforming coefficients (BFC) according to one embodiment of the invention. PN codes from a CES are received at the gateway. The fast error effects, $E_f(t)$, are first removed at block 325. The resulting signal is then beamformed at block 330. The beamforming increases the strength of the signal from which the medium effects, $E_m(t)$, may be extracted at block 335. Those skilled in the art will recognize various ways to extract medium effects from the PN codes. The resulting signal, after removal of the fest effects, $E_f(t)$, is also sent to block 340 where the medium effects, $E_m(t)$ are removed. The PN codes are correlated at block 345 and run through averaging loops at block 350 after which BFC are returned.

Figure 3D:
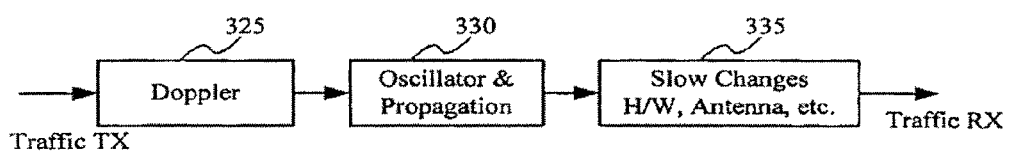
Figure 3E:
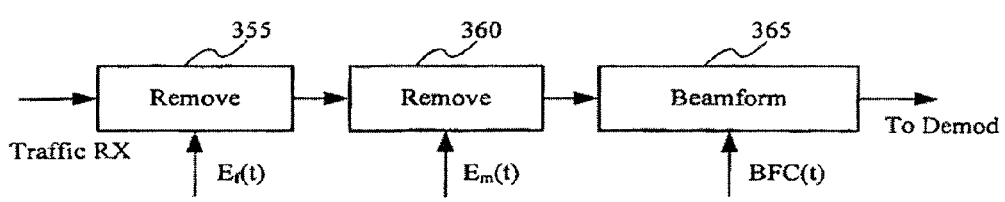

FIG. 3D shows a block diagram detailing various effects encountered by data traffic transmitted by a CES to a gateway through the return link. The data traffic encounters the same channel effects as the PN codes. FIG. 3E shows a block diagram for removing the estimated path effects from a signal and applying BFC. The fast effects are removed at block 355. Following which the medium effects are removed at block 360. Ground-based beam forming may then occur at block 365 by applying the BFCs. Accordingly, signals from the various transmitters may transmit signals including data traffic to the gateway through a satellite. These signals are beamformed at the gateway, after transmission using a method such as the one depicted in FIG. 3E.

Figure 4A:
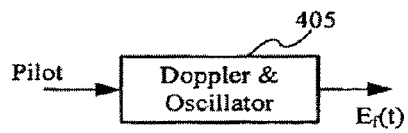
FIG. 4A-4E are three a block diagrams showing portions of a forward link calibration according to one embodiment of the invention.

FIG. 4A-4E are block diagrams showing portions of a forward link calibration according to one embodiment of the invention. Turning first to FIG. 4A, pilot signals are transmitted through the forward link from the gateway to one or more CES and undergo Doppler and/or oscillator shift as shown in block 405. The fast effects are determined at the CES and returned as $E_f(t)$. Those skilled in the art will recognize how to extract these Doppler and oscillator amplitude and phase shifts.

Figure 4B:
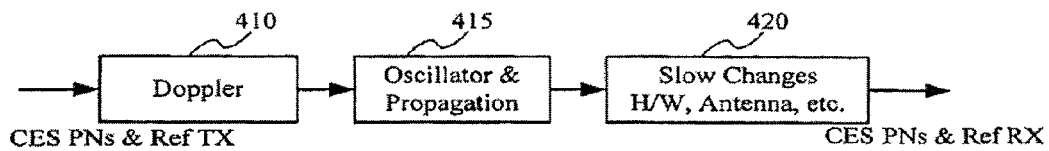

FIG. 4B shows a block diagram detailing various effects encountered by PN codes transmitted by a gateway to a CES through a forward link. These effects are commonly called medium effects. These effects may include Doppler effects 410, oscillator and propagation effects 415, and various slow effects from hardware, antenna, etc 420.

Figure 4C:
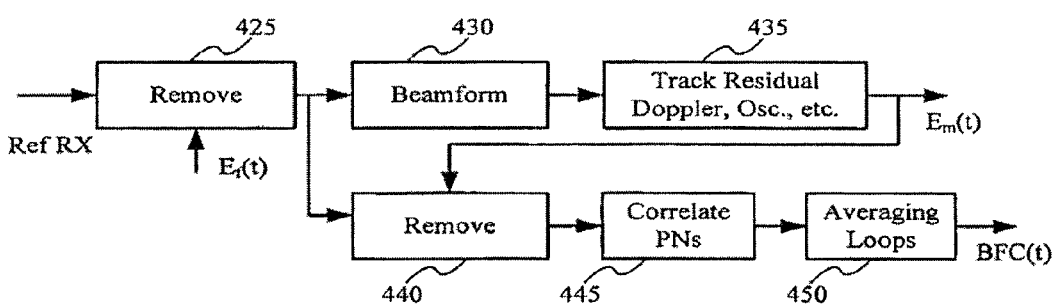

FIG. 4C shows a block diagram of a method used to track the medium effects and produce BFCs according to one embodiment of the invention. PN codes transmitted from a gateway are received at a CES. The fast error effects, $E_f(t)$, are first removed at block 425. The resulting signal is then beamformed at block 430. The beamforming increases the strength of the signal from which the medium effects, $E_m(t)$, may be extracted at block 435. Those skilled in the art will recognize various ways to extract medium effects from the PN codes. The resulting signal, after removal of the fest effects, $E_f(t)$, is also sent to block 440 where the medium effects, $E_m(t)$ are removed. The PN codes are correlated at block 445 and run through averaging loops at block 450 after which BFCs are returned.

Figure 4D:
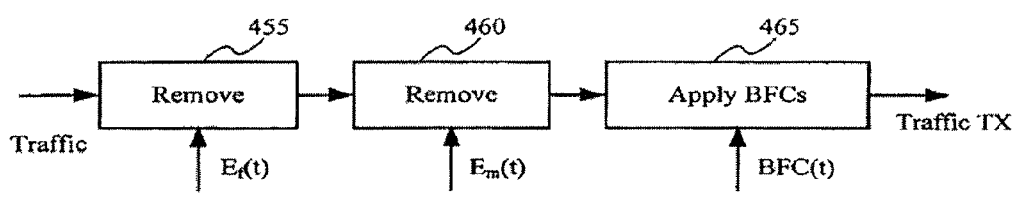

FIG. 4D shows a block diagram for removing the estimated path effects from a signal and applying the BFC. On the forward channel the corrections are made prior to transmission of the signal. Accordingly, error correction due to the path occurs prior to encountering the errors. The fast effects are removed from a signal at block 455. Following which the medium effects are removed at block 460. Forward link ground-based beam forming may then occur at block 465 by applying the BFCs. The traffic may then be transmitted to the CES through the satellite.

Figure 4E:
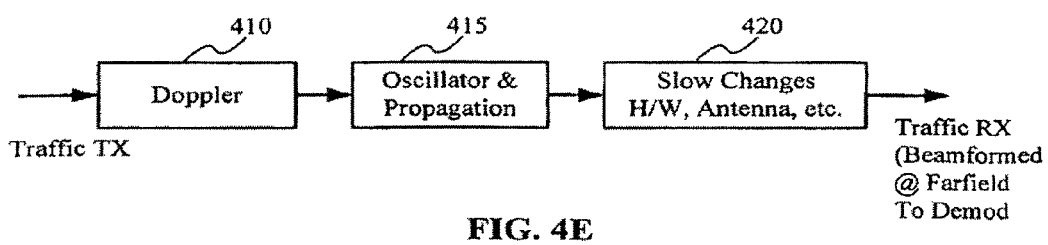

FIG. 4E shows a block diagram detailing various effects encountered by data traffic transmitted by a gateway to a CES through the forward link. These are the same effects encountered by the PN codes and shown in FIG. 4B. Precorrection has already occurred on the signal for these effects.

Return Link Calibration

Figure 5:
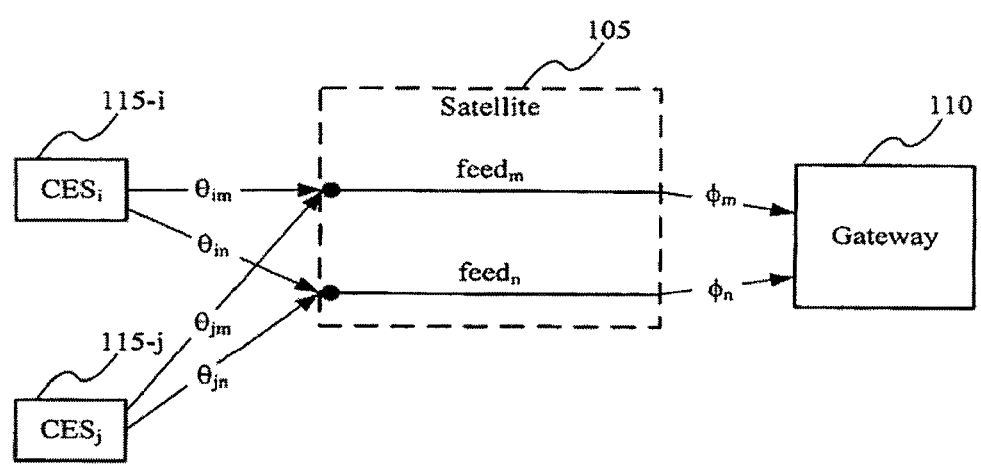
FIG. 5 shows a block diagram of two calibration earth stations communicating with a gateway through two feeds on a satellite according to one embodiment of the invention.

FIG. 5 shows a block diagram of two calibration earth stations 115-$i$, 115-$j$ communicating with a gateway 110 through two feeds on a satellite 105 according to one embodiment of the invention. As shown, the satellite 105 receives two signals at two separate antenna elements from each of the two CESs. For instance, $CES_j$ 115-$j$ transmits signal $\theta_j$ that is received at feed n as signal $\theta_{jn}$. The signal is also received at feed m as signal $\theta_{jm}$. Similarly $CES_i$ transmits a signal $\theta_i$ that is received at feed n as signal $\theta_{in}$. The signal is also received at feed m as signal $\theta_{im}$. These signals, $\theta_i$ and $\theta_j$ may be orthogonal PN codes. The satellite may be equipped with a plurality of feeds. Each signal may be received at any number of feeds. In some cases, a signal from a CES may be received at a single feed, at two feeds or at three feeds up to being received at every feed. Accordingly, $feed_n$ and $feed_m$ comprise signals from both CESs 115. These feeds are then transmitted to the gateway 110 where they may be used to calibrate the satellite return link and/or for generating beamforming parameters for the satellite.

Figure 6:
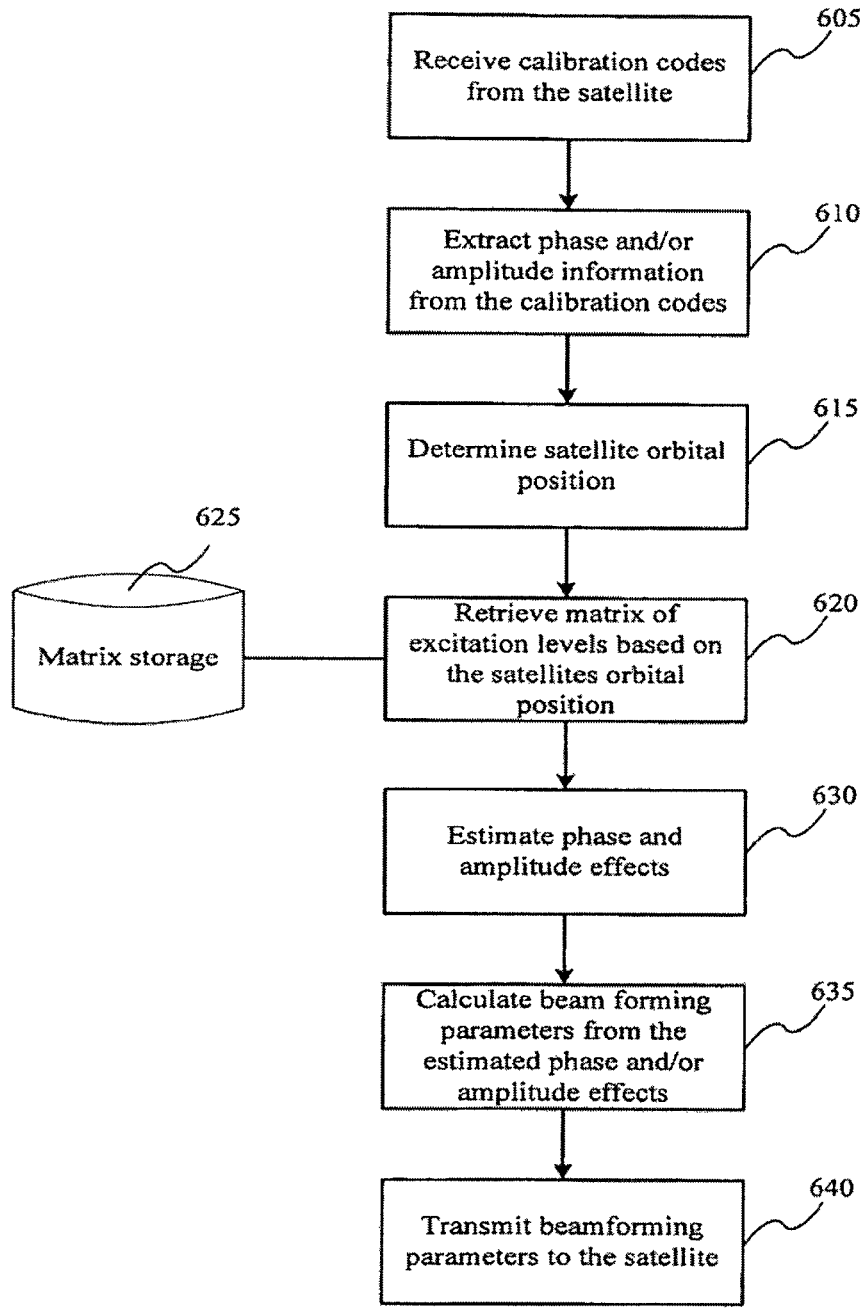
FIG. 6. shows a flowchart of a method for determining beamforming parameters based on the phase and amplitude effects of a satellite return link according to one embodiment of the invention.

FIG. 6 shows a flowchart for generating beamforming parameters from the received PN codes according to one embodiment of the invention. PN codes are received from the satellite at block 605. The PN codes may comprise PN codes from a plurality of CESs transmitted through a plurality of feeds at the satellite. Each of the antenna elements on the satellite receives significant excitation from at least one CES. In an exemplary system, roughly half the elements receive significant excitation from 2 or more CESs. Table 1 shows an exemplary table of signals received at the gateway from four CESs through 10 satellite feeds. As shown, not all feeds are illuminated by all of the CESs. By processing the PN codes at the gateway, individually before beamforming, the function of slow calibration can be performed to characterize all element paths. The blank entries in the table indicate that the PN code originated from a given CES (beam) is not received with sufficient quality by a corresponding feed element, and is therefore discarded at the satellite or at the gateway. Conversely, the entries in the table indicate signals of sufficient quality that are included in the optimization that follows. When the table is fully populated, each feed can see more than one CES station

TABLE 1

Exemplary table of PN codes received from 4 CESs through 10 satellite feeds.

|  | $CES_1$ | $CES_2$ | $CES_3$ | $CES_4$ |
|---|---|---|---|---|
| $Feed_1$ |  | $PN_{12}$ | $PN_{13}$ |  |
| $Feed_2$ |  |  |  | $PN_{24}$ |
| $Feed_3$ |  |  | $PN_{33}$ |  |
| $Feed_4$ | $PN_{41}$ |  | $PN_{34}$ | $PN_{44}$ |
| $Feed_5$ |  |  |  | $PN_{54}$ |
| $Feed_6$ | $PN_{61}$ | $PN_{62}$ |  |  |
| $Feed_7$ |  |  |  | $PN_{74}$ |
| $Feed_8$ |  |  | $PN_{83}$ |  |
| $Feed_9$ |  |  |  | $PN_{94}$ |
| $Feed_{10}$ | $PN_{101}$ |  | $PN_{103}$ |  |

The phase and/or amplitude effects of the satellite return link may be extracted from the PN codes at block 610. The phase and/or amplitude effects may occur from one or two sources at the satellite. As shown in FIG. 5, the path from a CES 115 to the satellite including the satellite receiver may provide one source of phase shift and/or amplitude changes. These effects are denoted as θ. The path from the satellite 105 to the gateway 110 including the satellite transmitter may proved a second source of phase shift and/or amplitude changes. These effects are denoted as φ. Accordingly, this phase shift and/or amplitude changes information may be extracted from the received PN codes. This information may be extracted by comparing the transmitted PN codes with the received PN codes. Table 2 shows the return link phase shifts associated with the received PN codes. A similar table may also be constructed for the return link amplitude changes.

TABLE 2

Exemplary table of phase return link phase shifts.

|  | $CES_1$ | $CES_2$ | $CES_3$ | $CES_4$ |
|---|---|---|---|---|
| $Feed_1$ |  | $φ_1 + θ_2$ | $φ_1 + θ_3$ |  |
| $Feed_2$ |  |  |  | $φ_2 + θ_4$ |
| $Feed_3$ |  |  | $φ_3 + θ_3$ |  |
| $Feed_4$ | $φ_4 + θ_1$ |  | $φ_4 + θ_3$ | $φ_4 + θ_4$ |
| $Feed_5$ |  |  |  | $φ_5 + θ_4$ |
| $Feed_6$ | $φ_6 + θ_1$ | $φ_6 + θ_2$ |  |  |
| $Feed_7$ |  |  |  | $φ_7 + θ_4$ |
| $Feed_8$ |  |  | $φ_8 + θ_3$ |  |
| $Feed_9$ |  |  |  | $φ_9 + θ_4$ |
| $Feed_{10}$ | $φ_{10} + θ_1$ |  | $φ_{10} + θ_3$ |  |

Embodiments of the invention provide for methods and systems that perform estimations of these phase shifts jointly rather than estimating these phase shifts one at a time. Returning to FIG. 6, estimation of the phase shift occurs at block 630. The phase shift is a function that can be based on the excitation level at the antenna elements at the satellite. Because the gain of the various satellite antenna elements as seen from fixed CES locations change, these excitation levels depend on the orbital position of the satellite. Accordingly, in one embodiment of the invention, the orbital position of the satellite is determined at block 615. That is the satellite may communicate orbital position to the gateway or the gateway may track the satellite and determine orbital position. A matrix of excitation levels based on the orbital position may be retrieved from the memory 625 at the gateway at block 620. The matrices may change over time. Accordingly, the matrices may be updated periodically. The satellite may communicate The phase shift caused by the return link may then be estimated, for example, by minimizing the optimal weighted minimum mean square (WMMS) error. The weights are based on the feed excitation levels in the matrix of excitation levels. The WMMS estimator generates a system of linear equations in the variables to be estimated. The matrix of the linear system of equations resulting from the WMMS depends only on the nominal feed excitation levels.

Once the phase shifts are estimated, the return link may be calibrated. In one embodiment of the invention, beamforming parameters may be calculated and/or adjusted based on the known return link phase shifts in block 635. At block 640, these parameters are transmitted to the satellite. As shown in the flowchart, the amplitude effects may also be estimated using a similar scheme. Any beamforming techniques may be used to calculate the beamforming parameters using the phase and/or amplitude corrections.

If the error in estimating entry ij of the 2 dimensional array be denoted by $e_{ij}$, and if $Θ_i$ and $Φ_j$ indicate the estimate of $θ_i$ and $φ_j$, respectively, then $$e_{ij} = θ_i + φ_j - (Θ_i + Φ_j). \quad \text{eq. 1}$$

the weighted sum of squares of the errors $e_{ij}$ can be written as $$E^2 = \sum_i^I \sum_j^J w_{ij} e_{ij}^2, \quad \text{eq. 2}$$

where the $w_{ij}$ are weights chosen proportional to the signal-to-noise ratio corresponding to entry ij of the array. That is, w is the matrix of excitation levels. The blank entries in the array (see Table 1) are given a weight of zero. Taking derivatives of $E^2$ with respect to $θ_i$ and to $φ_j$, and then those derivatives may be set to zero, as is commonly done in minimum mean square estimation.

$$\frac{\partial E^2}{\partial θ_i} = 0 \quad \text{eq. 3}$$

for $i = 1, 2, \ldots, I$, and $$\frac{\partial E^2}{\partial φ_j} = 0 \quad \text{eq. 4}$$

for $j = 1, 2, \ldots, J$.

Eq. 3 and eq. 4 return a set of I+J linear equations with I+J unknowns. Now, let $$A_i = \sum_j^J w_{ij}(θ_i + φ_j), \text{ and} \quad \text{eq. 5}$$

$$B_j = \sum_i^I w_{ij}(θ_i + φ_j). \quad \text{eq. 6}$$

Substituting the $A_i$ and $B_j$ into eq. 3 and eq. 4 a matrix equation can be returned $$P \cdot W = C. \quad \text{eq. 7}$$

Where W is a matrix whose coefficients are $w_{ij}$ and P and C are vectors of the following form:

$$P = [Θ_1, Θ_2, \ldots, Θ_I, Φ_1, Φ_2, \ldots, Φ_J], \text{ and} \quad \text{eq. 8}$$

$$C = [A_1, A_2, \ldots, A_I, B_1, B_2, \ldots, B_J]. \quad \text{eq. 9}$$

The matrix W is known and C is a vector of known quantities. Accordingly, the estimated phase shifts $Φ_j$ and $Θ_i$ can then be determined using $P = W^{-1} C$. The matrix W may be inverted and stored in memory for fast processing at the gateway.

The preceding discussion of the WMMS dealt with the estimation of phase from the received PN codes. Phase variations arising from different sources along the return link are added to produce the overall phase change. Amplitude variations arising from different sources are multiplied to produce the overall amplitude change. When measured in dBs, amplitude changes are added to produce the overall amplitude change. Mathematically amplitudes in dBs can be treated similarly to phases in degrees or radians, and a similar procedure to the WMMS outlined above can be used for estimating amplitudes in dBs. PN codes may be continuously transmitted over the forward channel along with data and other communications.

Forward Link Calibration

Figure 7A:
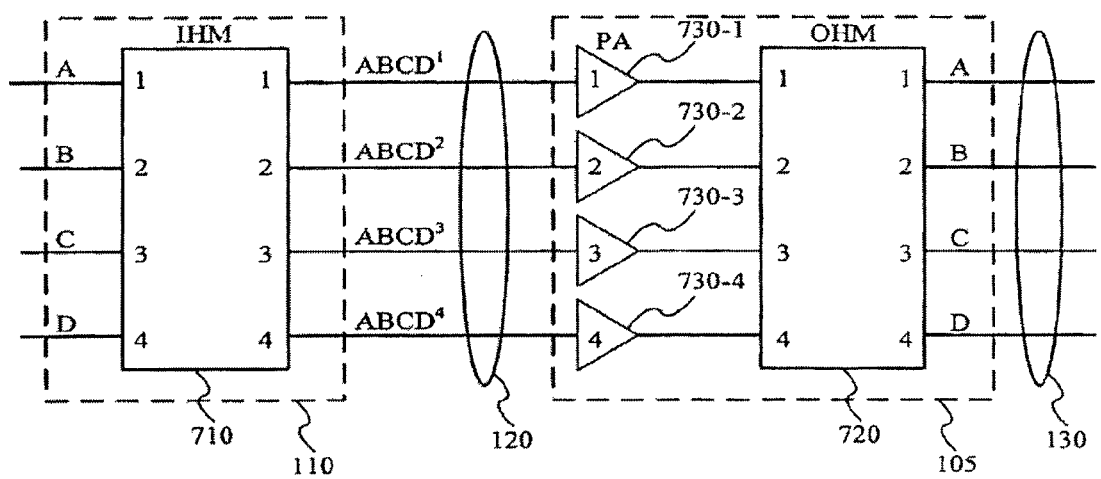
FIG. 7A shows a hybrid matrix used in a ground-based beamforming (GBBF) satellite system according to one embodiment of the invention.

FIG. 7A shows a hybrid matrix used in a ground-based beamforming (GBBF) satellite system according to one embodiment of the invention. The hybrid matrix includes an input hybrid matrix (IHM) 710 at the gateway 110, power amplifiers 730 and an output hybrid matrix (OHM) 720 at the satellite 105. In the case shown in the figure, the IHM 710 receives four signals A, B, C and D, at the input of the IHM 710. The individual signals, A, B, C and D, are combined in a linear transformation and uplinked through a feeder link 120 to the satellite 105. The signals are then individually amplified at a series of power amplifiers 730 and the amplified signals are input at the input ports of an OHM 720. The signals are recombined as a linear combination of signals at the OHM 720 and then downlinked through a service link 130 to receivers using the proper antenna and downlinks. The OHM 720 essentially performs the opposite function as the IHM 710. Accordingly, each receiver receives a linear combination of the four signals. While a 4×4 IHM and a 4×4 OHM are shown, any number of ports may be used on the IHM and OHM. IHM and OHM commonly have ports with a factor of 2.

Both the IHM 710 and OHM 720 may include a plurality of 3 dB couplers. The IHM operation may be performed in the digital domain, before conversion to analog.

As shown in the figure, the OHM will contain a linear combination of the 4 input signals. Each output port has the same signal components, but with different phase rotations which are multiples of 90°. The $i^{th}$ output of the IHM is labeled $ABCD^i$.

Embodiments of the invention provide calibration for the various portions of the forward link from the gateway 110 through the satellite 105 to receivers, such as calibration earth stations (CESs) 115. Various calibration schemes, techniques, methods and systems are provided throughout this disclosure.

Figure 7B:
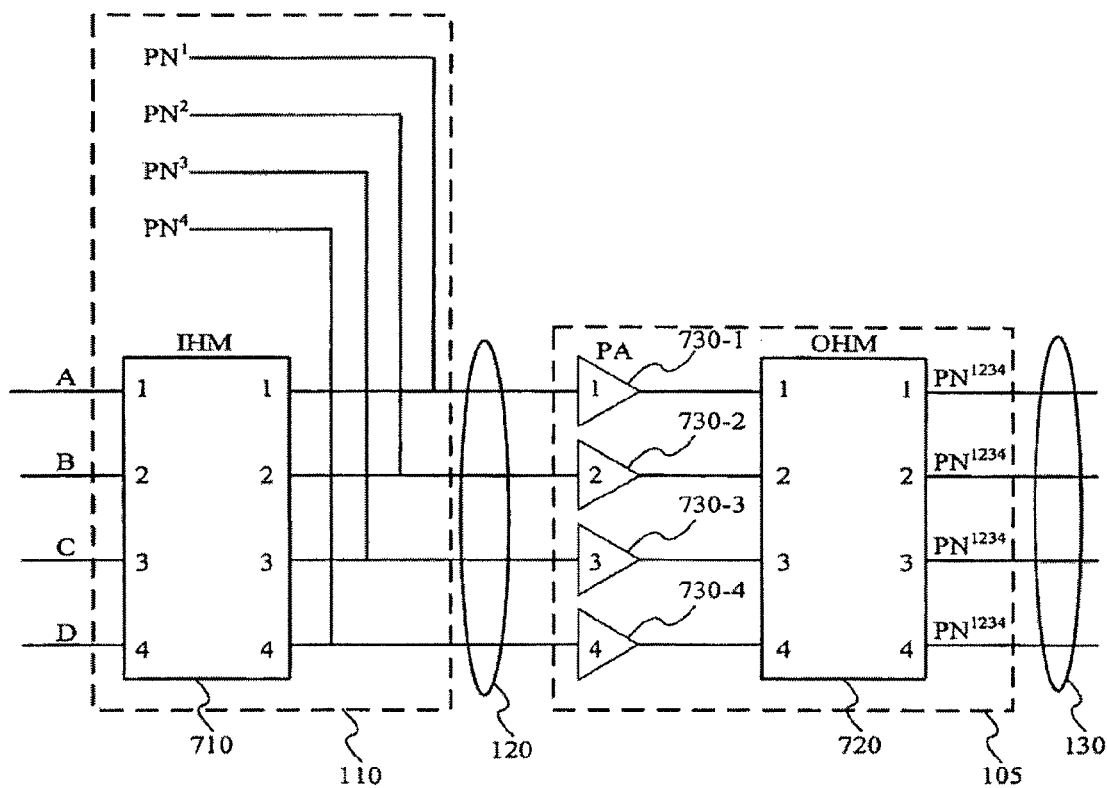
FIG. 7B shows a hybrid matrix with calibration codes input after the input hybrid matrix (IHM) as used in a ground-based beamforming (GBBF) satellite system according to one embodiment of the invention.

In one embodiment of the invention, orthogonal codes are used to calibrate all or some of the forward link. FIG. 7B shows a hybrid matrix with pseudo-noise (PN) codes input after the IHM at the gateway. Each of the calibration codes is orthogonal to each other PN code. That is, the dot product of $PN^i$ and $PN^j$ equals 0, where $i \neq j$. While calibration codes are used in this example, any type of orthogonal coding scheme may be used. For example, the calibration codes may be derived from columns of a Walsh matrix. The calibration codes may include a series of values that include either +1 or −1. Unique calibration codes are introduced after the outputs of the IHM 710 and are transmitted to the satellite 105 through the forward uplink 120. As will be discussed further, the calibration codes may be used by the satellite system to calibrate the forward link of the system. The calibration information may then be used to provide ground-based beamforming parameters.

The calibration codes may be transmitted at the same time as other data is being transmitted to the satellite and then to various receivers. Because the codes are pseudo-noise codes, the calibration codes will not interfere with the transmitted data. Moreover, calibration codes may also be transmitted from the gateway to the satellite at times when data is not being transmitted.

Figure 7C:
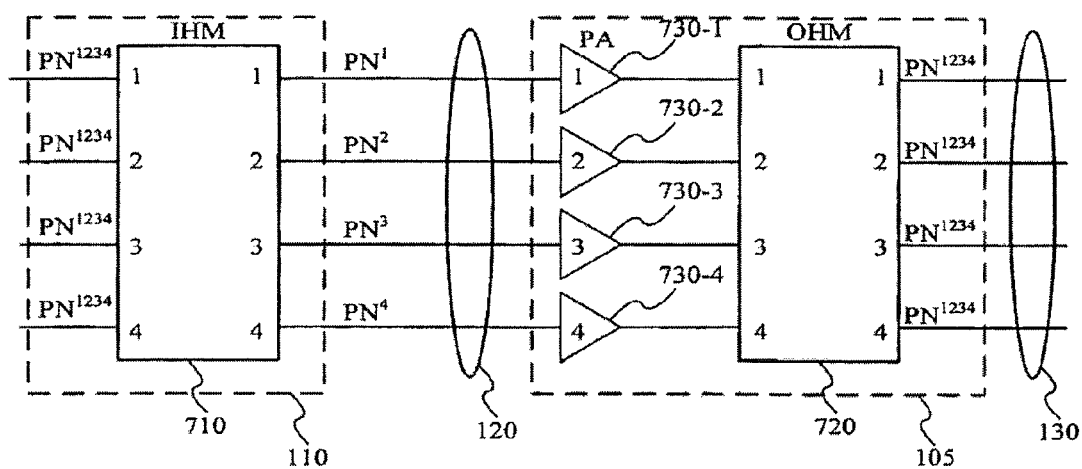
FIG. 7C shows a hybrid matrix with calibration codes input at the input ports of the IHM as used in a GBBF satellite system according to one embodiment of the invention.

FIG. 7C shows a hybrid matrix with calibration codes input at the input ports of the IHM as used in a ground-based beamforming (GBBF) satellite system according to one embodiment of the invention. As shown, four calibration codes $PN^{1234}$ are input at each port of the IHM 710 and the four calibration codes are returned from the IHM 710 and uplinked to the satellite 105.

As shown in FIGS. 7B and 7C, each PN code is output from the OHM as a linear combination of calibration codes. Thus, each CES receives each PN code from the satellite. Thus, a single CES that receives the linear combination of calibration codes may determine the phase and/or amplitude effects of the forward link.

Figure 8:
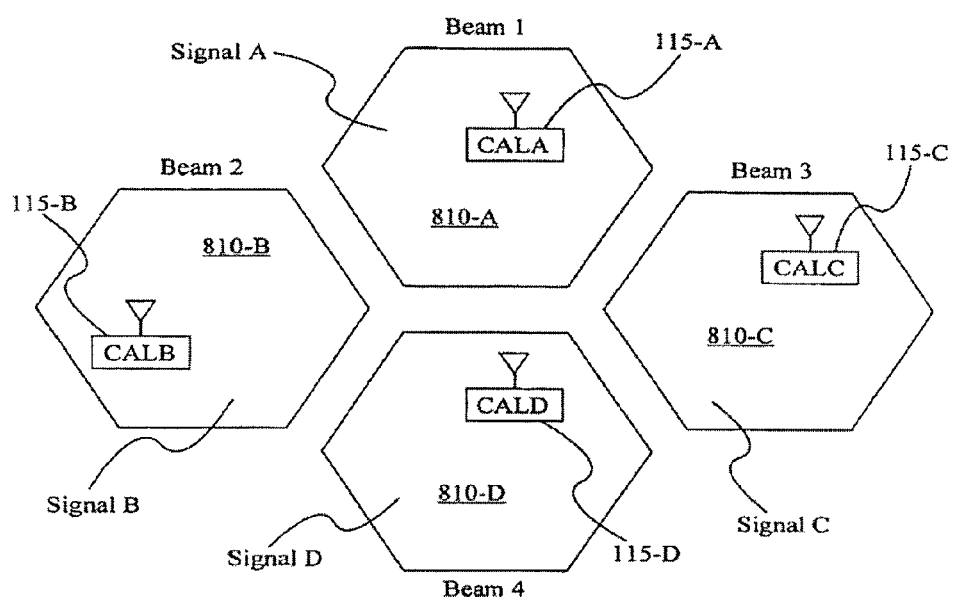
FIG. 8 shows a series of spot beam patterns from a satellite with a calibration earth station (CES) within each spot beam.
Figure 9:
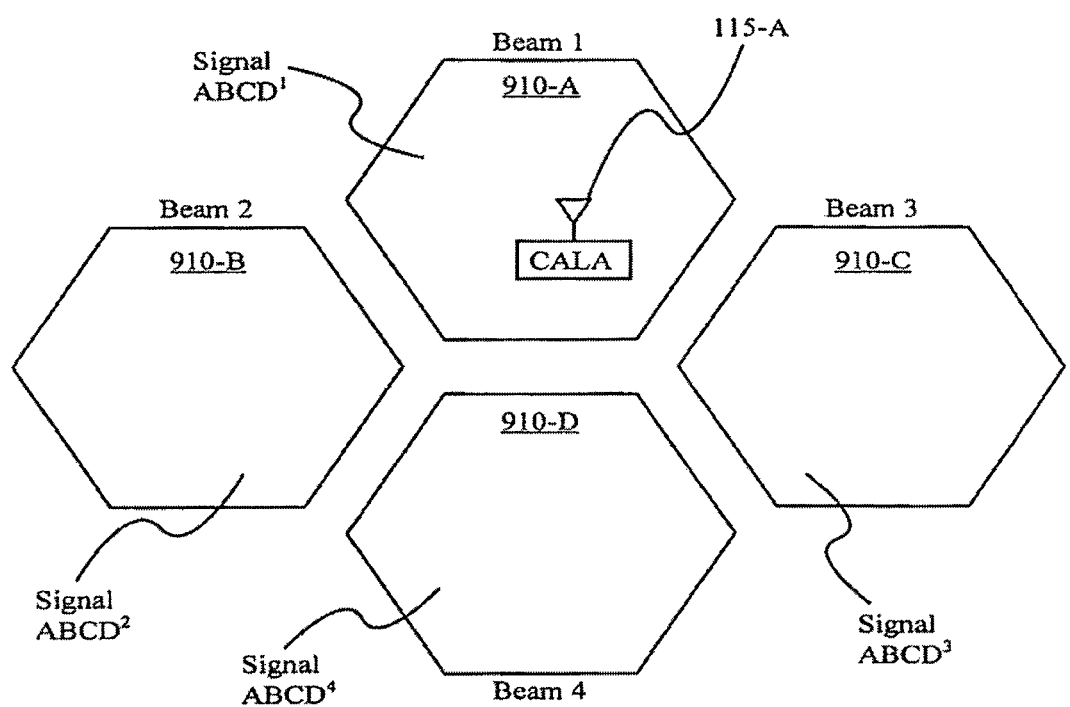
FIG. 9 shows a series of spot beam patterns from a satellite with a CES used for a plurality of spot beam patterns according to one embodiment of the invention.

If the satellite does not output each PN code as a linear combination of the calibration codes on each feed then a CES is required in each and every spot beam as shown in FIG. 8. However, employing embodiments of the present invention each feed provides a linear combination of calibration codes, then a single CES may be employed that receives each of the calibration codes as shown in FIG. 9. Four spot beam patterns 910 are shown. Each spot beam receives the linear combination of signals shown as ABCD in the figures. Spot beam 1 910-A receives calibration codes $ABCD^1$. Spot beam 2 910-B receives calibration codes $ABCD^2$. Spot beam 3 910-C receives calibration codes $ABCD^3$. Spot beam 4 910-D receives calibration codes $ABCD^4$. In this example, only spot beam 1 includes a CES 115. Because each feed from the satellite includes every code, only one CES is required to calibrate the forward link. Of course, for redundancy, quality and interference purposes, more than one CES may be used over a number of spot beams.

The CES may be required, in one embodiment of the invention, to receive the calibration codes ABCD with sufficiently high signal-to-noise ratio. Moreover, the power assigned to each code is selected such that all codes are received at approximately the same signal level at the CES. That is, weak feeds are assigned more power than strong feeds. Since these codes are all different, for example without beamforming advantage, and since they lose 6 dB in the hybrids (they appear on all 4 ports of the hybrids, but only one port is useful in general), it may be beneficial to boost the power assigned to those codes. The total satellite power allocated to these forward-calibration PN codes is generally significantly less than 1% of the total satellite power. In other embodiments of the invention the satellite power is less than 0.5%, 1.5%, 2%, 2.5%, 3%, 3.5%, 4% 4.5% or 5%.

In addition to the orthogonal calibration codes used for calibrating the forward links and/or paths, reference signals may be sent to be beamformed in the far field at the CES. The reference signals may be transmitted with more power than comparable traffic signals of similar transmission rate. The purpose of the reference signals is to track the status of the channel for the medium calibration stage. This allows for code correlation and post-correlation averaging of relatively long durations (on the order of 100 milliseconds) for each of the calibration codes that perform the function of slow calibration.

At the CES 115, the phase and/or amplitude of the received PN code(s) may be compared with the phase and/or amplitude of the calibration codes sent by the gateway. The CES may receive the originally transmitted calibration codes or information about the phase and/or amplitude of the calibration codes from the gateway through a terrestrial link (as shown in FIG. 1) or through the satellite. The calibration codes may also be determined prior to implementation in the system. Accordingly, the phase and amplitude shift in each of the calibration codes may be used to calibrate aspects of the forward link. The CES may transmit the phase and/or amplitude shift data back to the gateway through the satellite or through a terrestrial link. In another embodiment of the invention, the calibration codes may be transmitted to the gateway, which may be used at the gateway to determine beamforming parameters. For example, beamforming parameters for an antenna array at the satellite may be calculated at the gateway. The proper phase and amplitude adjustments to the signal may, therefore, occur at the gateway. The phase and/or amplitude shift from the forward link as found through the calibration codes may be applied to the beamforming calculation.

Placing the IHM at the gateway may require that the paths from the gateway to the OHM and the paths after the OHMs be calibrated separately. If it were possible to characterize the temperature dependence of any diplexers placed after the OHMs, then calibration after the OHMs may not be needed. Otherwise, calibration of the paths after the OHMs is needed, although changes along those paths may be typically slow. Accordingly, embodiments of the invention provide for calibration of the paths from IHM to OHM, calibration of paths after the OHM without diplexers, and calibration of the paths after the OHM with diplexers.

Figure 10:
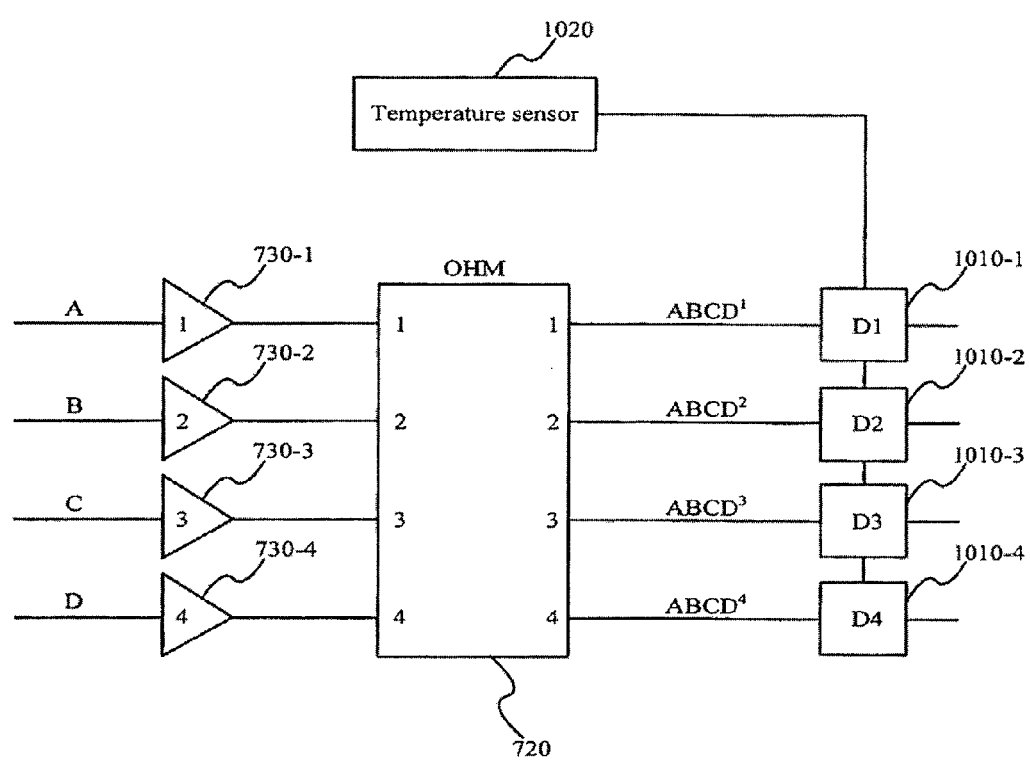
FIG. 10 shows an output hybrid matrix (OHM) with diplexers and a temperature sensor according to one embodiment of the invention.

FIG. 10 shows an OHM 720 with diplexers 1010 and a temperature sensor 1020 according to one embodiment of the invention. The phase and/or amplitude effects on a signal or signals through the diplexers 1010 may depend on the temperature of the diplexer. As such, these effects may be characterized prior to deployment of the satellite and the temperature versus the phase and/or amplitude shift may be stored in a look-up table at the gateway. More than one temperature sensor may be employed at the satellite. In one embodiment, a temperature sensor may measure the temperature of each diplexer. In another embodiment of the invention, one or more temperature sensor may measure the temperature of a group of diplexers.

Figure 11:
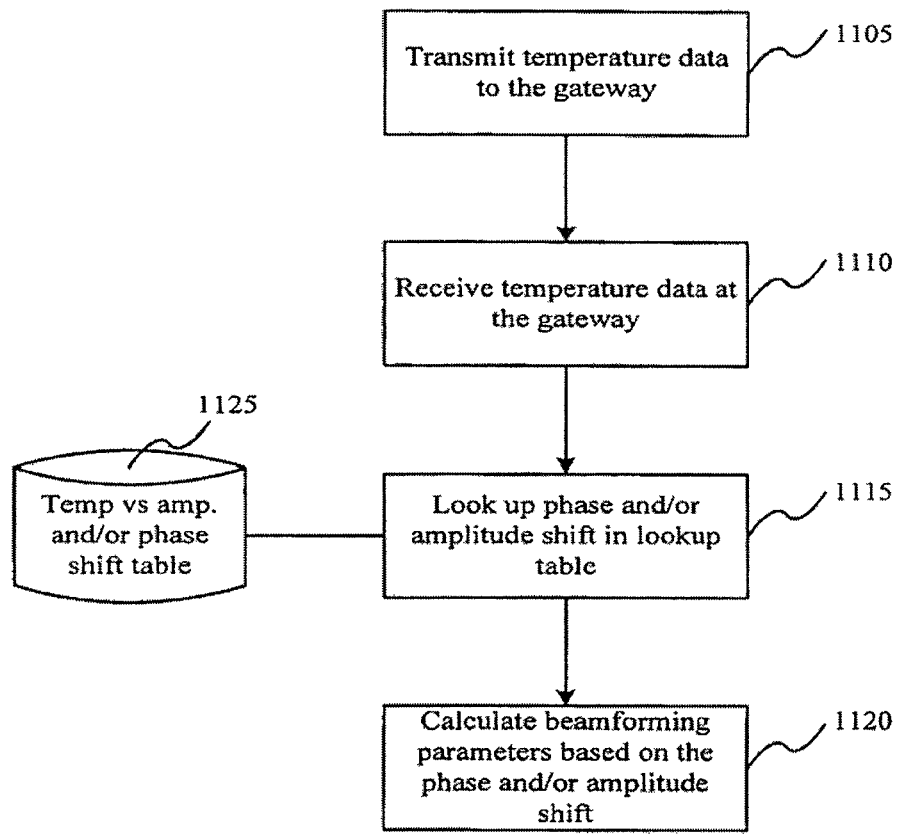
FIG. 11 shows a flowchart depicting a method for calibrating the forward link of a satellite system using temperature information from the satellite according to one embodiment of the invention.

As shown in FIG. 11, the temperature sensor 1020 on the satellite may record the temperature of diplexer or diplexers 1010 and transmit the temperature to the gateway on a return feeder link at block 1105. The gateway may receive the temperature at block 1110 and then compensate for these phase and/or amplitude effects by looking up the phase and/or amplitude shift in the lookup table 1125 using the temperature at block 1115. The phase and/or amplitude shift(s) may be applied to beamforming calculations at a GBBF at block 1120. The temperature of the diplexers may be measured with a single temperature sensor and may be used to look-up phase and/or amplitude variation data. In one embodiment of the invention, the temperature-related variations are determined for a group of diplexers using the look up table. In another embodiment, each diplexer uniquely affects the phase and/or amplitude and each diplexer has a unique lookup table. The phase and/or amplitude variations may then be determined one diplexer at a time.

Figure 12:
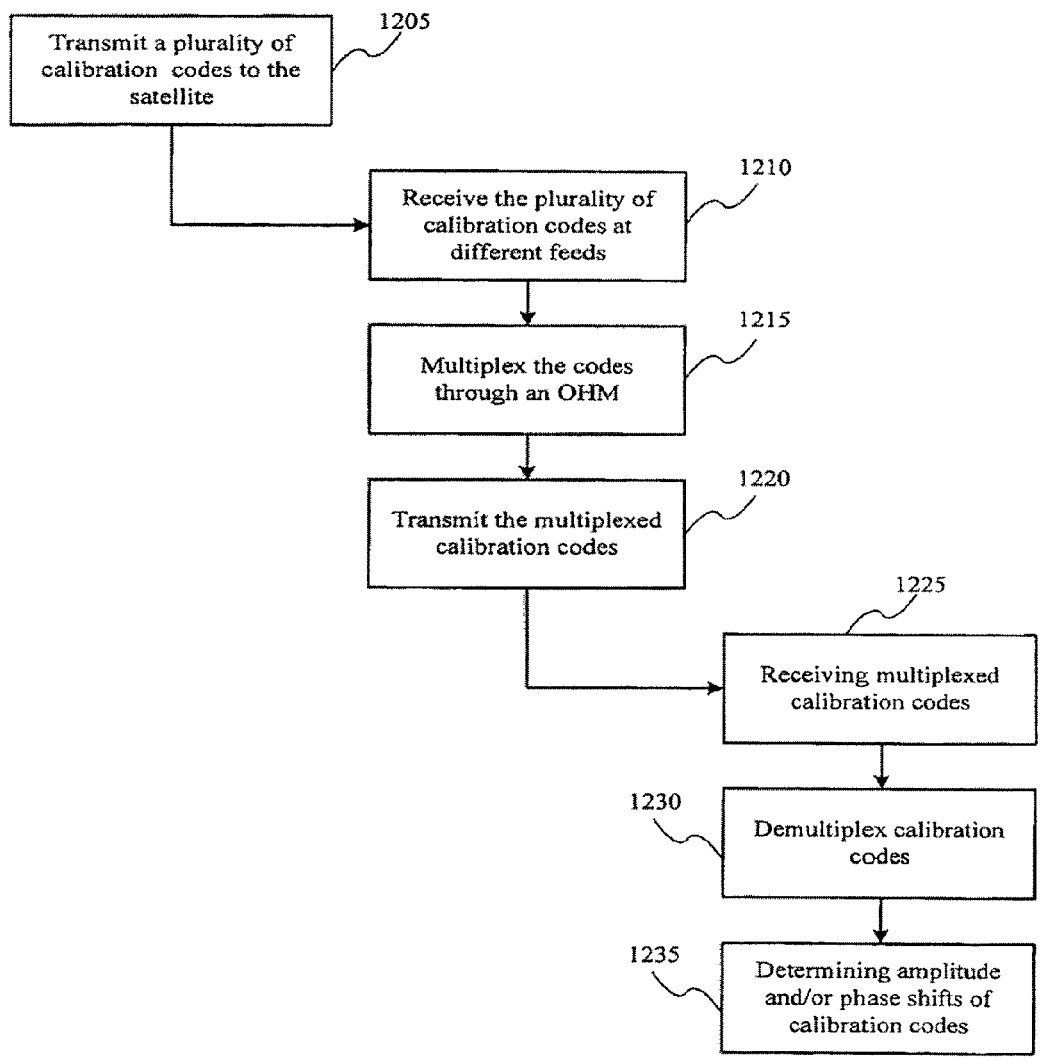
FIG. 12 shows a flowchart depicting a method for calibrating the forward link of a satellite system using orthogonal calibration codes according to one embodiment of the invention.

FIG. 12 shows a flowchart depicting a method for calibrating the forward link of a satellite system using orthogonal calibration codes according to one embodiment of the invention. A plurality of calibration codes, for example PN Codes, are transmitted to the satellite at block 1205. Each PN code is transmitted to a separate feed of the satellite. The calibration codes may be added before or after an IHM as shown in FIGS. 7B and 7C. The calibration codes may be transmitted to the satellite over separate paths and/or to distinct satellite feeds.

The calibration codes are received at the satellite at block 1210 and multiplexed through an OHM at block 1215, creating a linear combination of the calibration codes. This linear combination of calibration codes is then transmitted from each and every satellite feed at block 1220. The satellite may receive the calibration codes at block 1210 in one frequency band and transmit the codes in the same or a different band at block 1220.

The linear combination of calibration codes is received at each and every receiver including the CES within the spot beams of the feeds from the satellite at block 1225. Because a linear combination of calibration codes is transmitted from each and every feed of the satellite, any one CES may receive the calibration codes and separate the linear combination of calibration codes into the separate calibration codes at block 1230. A CES that receives the calibration codes may then determine the amplitude and/or phase shifts of the calibration codes at block 1235. The CES may compare each calibration code with the known calibration codes transmitted from the gateway. The known calibration codes may be stored at the CES and/or received at the CES through a terrestrial link. The amplitude and/or phase shifts may be communicated to the satellite and/or the gateway through the satellite or through a terrestrial link.

Figure 13:
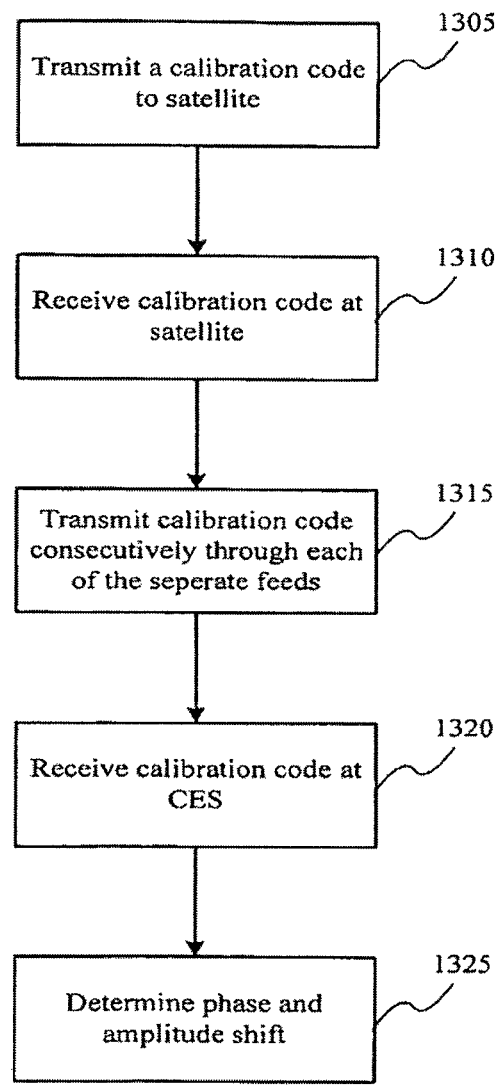
FIG. 13 shows a flowchart depicting a method for calibrating the forward service link of a satellite system according to one embodiment of the invention.

FIG. 13 shows a flowchart depicting a method for calibrating the forward service link of a satellite system according to one embodiment of the invention. In this embodiment it is not assumed that the phase and/or amplitude variations after the OHMs are negligible or could be inferred. The phase and/or amplitude variations after the OHMs vary slowly. These variations may be calibrated separately.

In one embodiment of this aspect of the subject invention, a monitoring PN code is assigned for this purpose. The monitoring PN codes are transmitted to and received by the satellite at blocks 1305 and 1310. The monitoring code may be transmitted from the gateway in one IHM at a time, in such a way that it excites, one after the other, each of the feeds of the corresponding OHM at the satellite at block 1315 and received at the CES at block 1320. By assigning more monitoring time or more power for the weaker feeds (as seen by the CESs), all feeds can be monitored from a few CES receiver locations. The phase and/or amplitude shifts and/or corrections may then be determined at the CES at block 1325. This periodic monitoring of variations after the OHMs, when used in combination with the forward calibration signals, may calibrate for all forward path variations (before and after the OHMs). If the variations after the OHMs are rapid, then all CESs could be used as receivers. However, slow variation is generally the case in practice.

Figure 14:
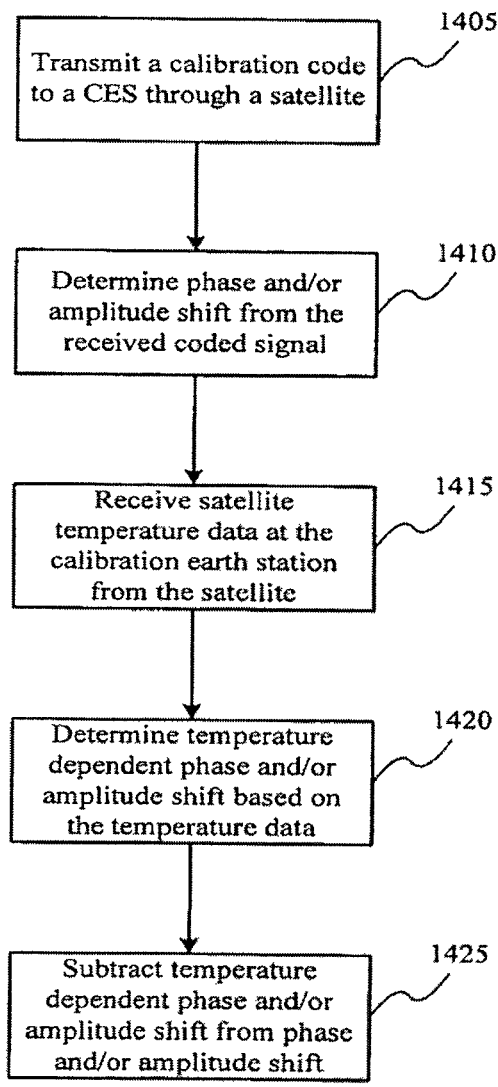
FIG. 14 shows a flowchart depicting a method for calibrating the forward link of a satellite system using orthogonal calibration codes and using temperature information from the satellite according to one embodiment of the invention.

FIG. 14 shows a flowchart depicting another method for calibrating the forward link of a satellite system using orthogonal calibration codes and using temperature information from the satellite according to one embodiment of the invention. Calibration codes are transmitted from a gateway to one or more CES through a satellite at block 1405. The phase and/or amplitude shift from the received coded signal may be determined at the CES at block 1410. In another embodiment of the invention, the CES sends the received coded signals to the gateway where the phase and/or amplitude shifts are determined. Satellite temperature data are received from the satellite at block 1415 from which the temperature dependent phase and/or amplitude effects may be determined at block 1420. The temperature-dependent phase and/or amplitude shifts may be subtracted from the other measured phase and/or amplitude shifts at block 1425. Thus, the effect of the forward calibration path on the phase and/or amplitude without the effects of the temperature effects may be determined. Because non-temperature dependant effects may be slowly changing, a system may determine these effects less often while determining the temperature effects more often.

Figure 15:
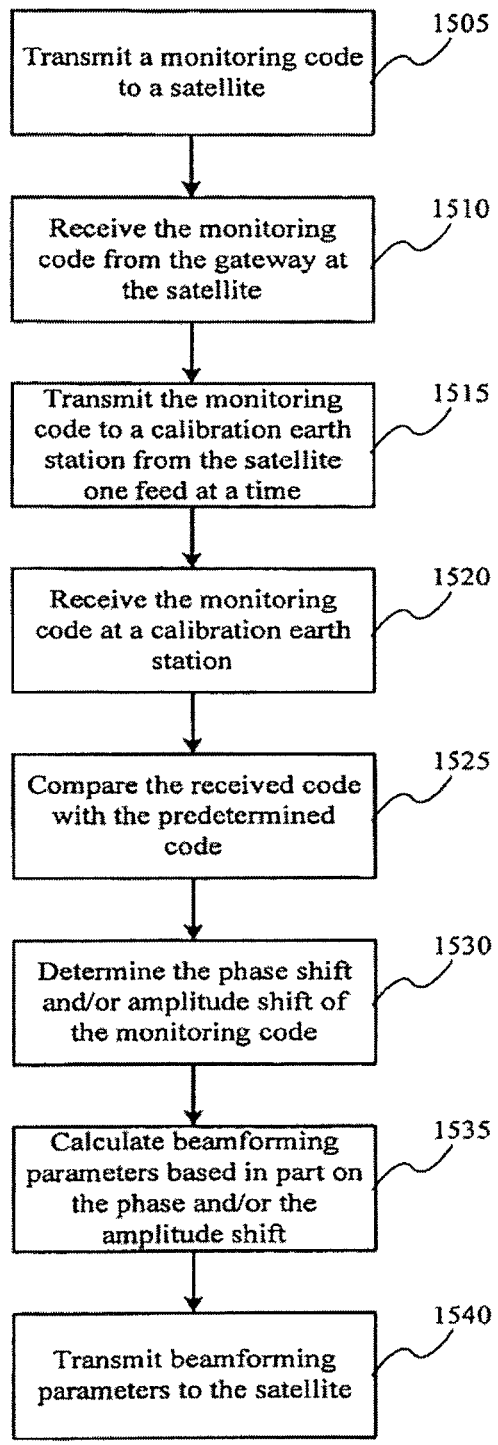
FIG. 15 shows a flowchart depicting a method for calibrating the forward link of a satellite system and using the calibration information to produce beamforming parameters according to one embodiment of the invention.

FIG. 15 shows a flowchart depicting a method for calibrating the forward link of a satellite system and using the calibration information to produce beamforming parameters according to one embodiment of the invention.

In many instances the phase and/or amplitude variations after OHMs were negligible or could be inferred (for instance by temperature monitoring and reporting). Such variations typically vary relatively slowly. In one embodiment of this aspect of the subject invention, a monitoring PN code is assigned for this purpose. The monitoring code is transmitted from the gateway in one IHM at a time to a satellite. The monitoring code, may be, for example, a PN code. The code is received at the satellite. The monitoring code may be transmitted to the satellite in such a way that it excites, one after the other, each of the 4 feeds of the corresponding OHM. By assigning more monitoring time or more power for the weaker feeds, as seen at the CES, all feeds can be monitored from a few CES locations. The monitoring code may be received at a CES where the received code is compared with the transmitted code. The phase and/or amplitude variations may be determined. Using the phase and/or amplitude variations beamforming parameters may be calculated and transmitted to the satellite. This periodic monitoring of variations after the OHMs, when used in combination with the forward calibration signals discussed above, calibrate for all forward path variations (before and after the OHMs). If the variations after the OHMs are rapid, then all CES, may be used as receivers. However, slow variation is generally the case in practice.

It should be noted that the systems, methods, and software discussed above are intended merely to be exemplary in nature. It must be stressed that various embodiments may omit, substitute, or add various procedures or components as appropriate. For instance, it should be appreciated that in alternative embodiments, the methods may be performed in an order different than that described, and that various steps may be added, omitted or combined. Also, features described with respect to certain embodiments may be combined in various other embodiments. Different aspects and elements of the embodiments may be combined in a similar manner. Also, it should be emphasized that technology evolves and, thus, many of the elements are exemplary in nature and should not be interpreted to limit the scope of the invention.

Specific details are given in the description to provide a thorough understanding of the embodiments. However, it will be understood by one of ordinary skill in the art that the embodiments may be practiced without these specific details. For example, well-known circuits, processes, algorithms, structures, and techniques have been shown without unnecessary detail in order to avoid obscuring the embodiments.

Also, it is noted that the embodiments may be described as a process which is depicted as a flowchart, a structure diagram, or a block diagram. Although they may describe the operations as a sequential process, many of the operations can be performed in parallel or concurrently. In addition, the order of the operations may be re-arranged. A process is terminated when its operations are completed, but could have additional steps not included in the figure.

Moreover, as disclosed herein, the terms "storage medium" or "storage device" may represent one or more devices for storing data, including read only memory (ROM), random access memory (RAM), magnetic RAM, core memory, magnetic disk storage mediums, optical storage mediums, flash memory devices or other computer readable mediums for storing information. The term "computer-readable medium" includes, but is not limited to, portable or fixed storage devices, optical storage devices, wireless channels, a sim card, other smart cards, and various other mediums capable of storing, containing or carrying instructions or data.

Furthermore, embodiments may be implemented by hardware, software, firmware, middleware, microcode, hardware description languages, or any combination thereof. When implemented in software, firmware, middleware or microcode, the program code or code segments to perform the necessary tasks may be stored in a machine readable medium such as a storage medium. Processors may perform the necessary tasks.

Having described several embodiments, it will be recognized by those of skill in the art that various modifications, alternative constructions, and equivalents may be used without departing from the spirit of the invention. For example, the above elements may merely be a component of a larger system, wherein other rules may take precedence over or otherwise modify the application of the invention. Also, a number of steps may be required before the above elements are considered. Accordingly, the above description should not be taken as limiting the scope of the invention, which is defined in the following claims.

What is claimed is:

1. A method for ground-based calibration of a satellite forward link, the method comprising:
    transmitting a plurality of orthogonal codes from a gateway to a satellite, wherein each of the plurality of orthogonal codes are received at a unique feed at the satellite;
    multiplexing the plurality of orthogonal codes into a linear combination of the plurality of orthogonal codes at the satellite;
    transmitting the linear combination of the plurality of orthogonal codes to a plurality of calibration earth stations over a plurality of feeds;
    receiving the linear combination of the plurality of orthogonal codes at at least one calibration earth station; and
    demultiplexing the linear combination of the plurality of orthogonal codes received at the at least one calibration earth station; and
    determining either or both of phase or amplitude shifts from the plurality of orthogonal codes.

2. The method according to claim 1 wherein:
    the plurality of orthogonal codes include at least one PN code;
    transmitting the linear combination of the plurality of orthogonal codes to a plurality of calibration earth stations over a plurality of feeds includes transmitting the at least one PN code through the plurality of feeds, wherein the at least one PN code is transmitted through each feed consecutively one after another; and
    determining either or both of phase or amplitude shifts from the plurality of orthogonal codes includes determining both the phase and amplitude shifts of the at least one PN code.

3. The method according to claim 2 wherein the at least one PN code is transmitted through one of the plurality of feeds for a period of time from 10 milliseconds to 10 seconds.

4. The method according to claim 1 wherein:
    the plurality of orthogonal codes is a plurality of orthogonal calibration codes included in a signal, the signal including at least one predetermined code, the signal transmitted from the gateway to the at least one calibration earth station through the satellite;
    receiving the linear combination of the plurality of orthogonal codes at the at least one calibration earth station includes receiving the at least one predetermined code at the at least one calibration earth station;
    comparing the received at least one predetermined code with the at least one predetermined code at the calibration earth station; and
    determining either or both of phase or amplitude shifts from the plurality of orthogonal codes includes determining either or both of the phase or amplitude shifts of the received at least one predetermined code.

5. The method according to claim 4 further comprising:
    calculating beamforming parameters based in part on either or both of the phase or amplitude shifts; and
    transmitting the beamforming parameters to the satellite.

6. The method according to claim 4, wherein the determining either or both of the phase or amplitude shifts of the received at least one predetermined code occurs at the at least one calibration earth station.

7. The method according to claim 4, wherein the determining either or both of the phase or amplitude shifts of the received at least one predetermined code occurs at the gateway.

* * * * *